No. 87,226. PATENTED FEB. 23, 1869.
M. VOORHEES & G. W. N. CUSTIS.
APPARATUS FOR SEASONING AND IMPREGNATING WOOD WITH
PRESERVATIVE SUBSTANCES.
2 SHEETS—SHEET 2.
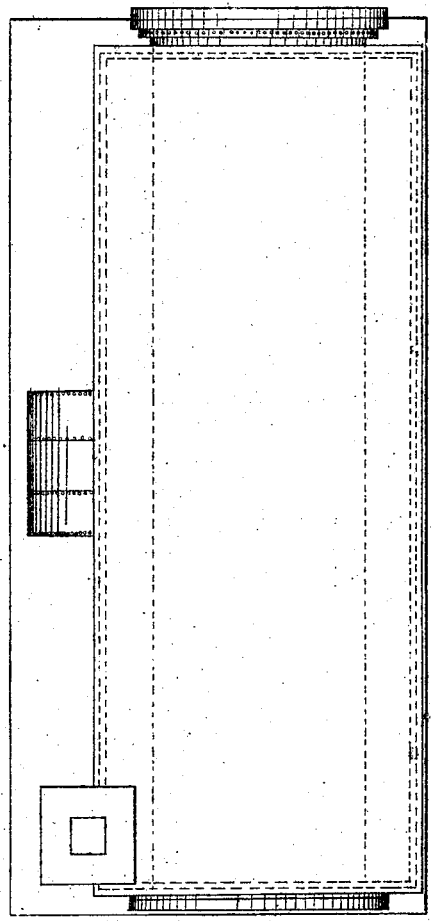
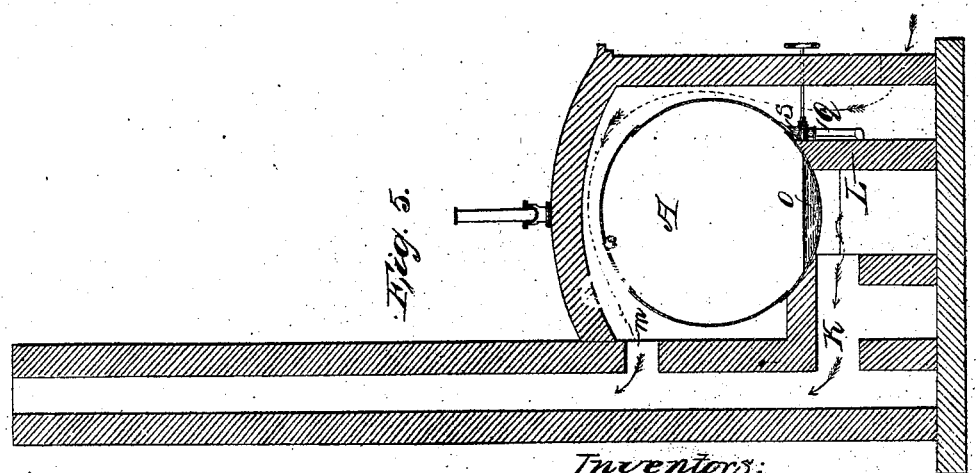

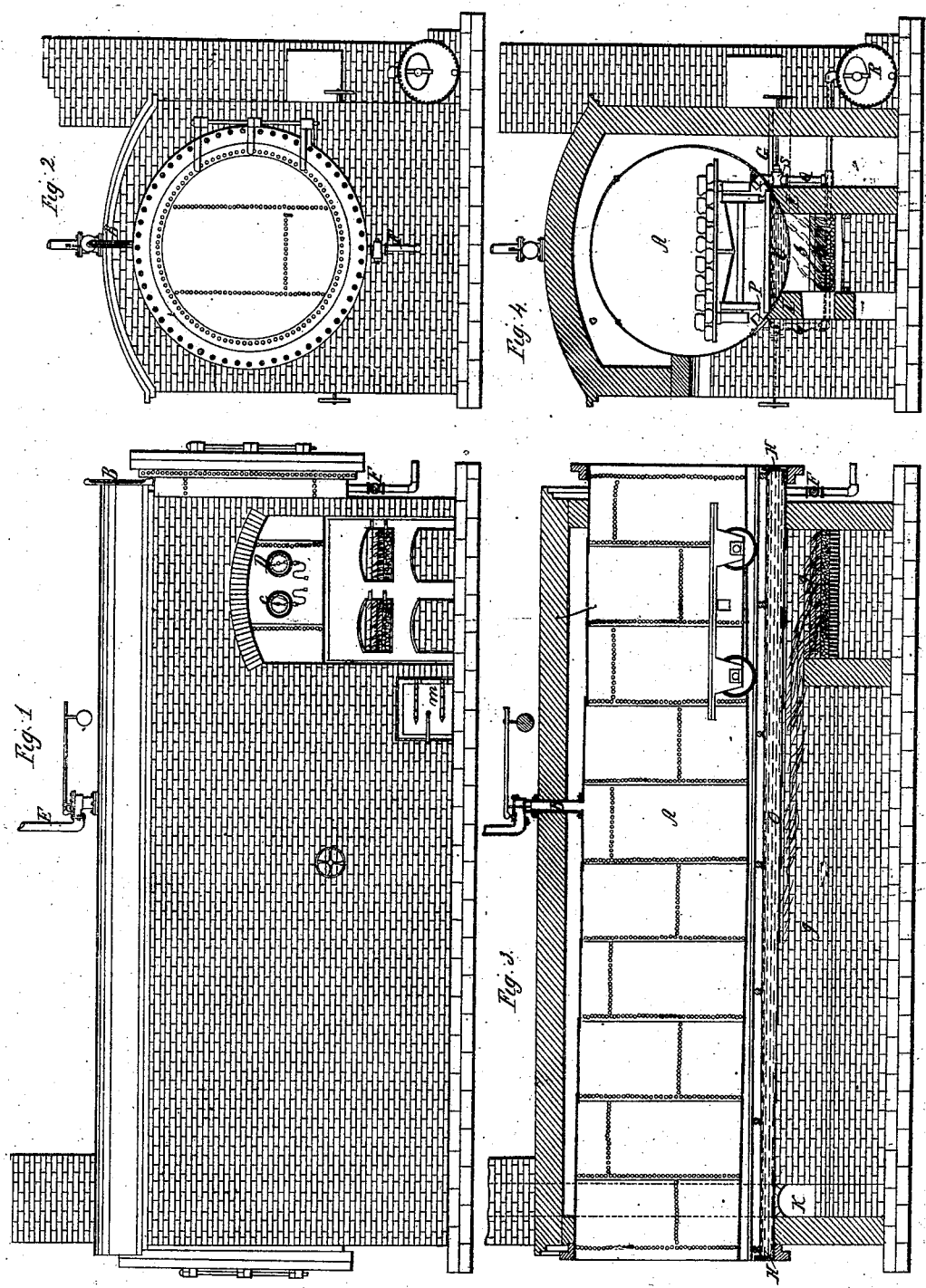

United States Patent Office.

MARTIN VOORHEES, OF PRINCETON, AND GEORGE W. N. CUSTIS, OF CAMDEN, NEW JERSEY.

Letters Patent No. 87,226, dated February 23, 1869.

IMPROVED APPARATUS FOR SEASONING AND IMPREGNATING WOOD WITH PRESERVATIVE SUBSTANCES.

The Schedule referred to in these Letters Patent and making part of the same.

*To all whom it may concern:*

Be it known that we, MARTIN VOORHEES, of Princeton, in the State of New Jersey, and GEORGE W. N. CUSTIS, of Camden, in the same State, have invented certain Improvements in Apparatus for Seasoning and Drying Wood, and for the Preservation of Wood, Textile Fabrics, &c.; and we do hereby declare that the following, taken in connection with the drawings which accompany and form part of this specification, is a description of our invention sufficient to enable those skilled in the art to practise it.

Among the many processes invented or used for the seasoning or drying of wood, and for the preservation of wood, textile fabrics, and other material, from mould or decay, or from the attacks of worms, that of subjecting them to the action of hot vapors of coal-tar, resin, or other oleaginous or antiseptic substances or compounds, is commanding much attention, and is believed to combine more desirable results, and to attain them with greater certainty and economy than any other. But for the more economical and perfect application of this process, a more simple and effective apparatus than any heretofore in use is desirable.

We have invented, and desire to secure by Letters Patent, what we believe to be such an apparatus, and which we will now proceed to describe, special reference being had to the accompanying drawings, which form a part of these specifications, and in which—

Figure 1 is a side elevation of an apparatus embodying our invention;

Figure 2 is an end elevation of the same;

Figure 3 is a vertical longitudinal section;

Figure 4, a cross-section, taken through the fire-chamber;

Figure 5, a cross-section, taken through the chimney;

Figure 6, a top view; and

Figure 7, a ground-plan.

Similar letters of reference indicate the same parts in all the drawings.

A represents a chamber, which may be of any required size, and of any suitable form, but which we prefer to make cylindrical.

This chamber we supply with doors at each end, if desirable, so arranged as to be steam or air-tight when closed; and we also provide it with a thermometer, B, a vacuum-gauge, C, a pressure-gauge, D, a safety-valve, E, a pipe, F, with cock, for the convenient passage of the residuum of oil or other material from the chamber, when desired, and a pipe, G, with cock, for the convenient passage of oil or other material into the chamber, provision being made therein for the retention of the oil in the chamber, when the doors are open, by the elevation, at each end of the chamber, of a plate, or flange, represented at H H, in fig. 3.

This chamber is placed over a furnace, I, and flue J, the latter serving to conduct the hot air, gases, &c., from the furnace to the chimney, with which it connects at K, thus conveying them beneath the chamber for its whole length, the latter being supported by the walls L L, which form the sides of the hot-air flue.

The whole is enclosed by a casing, which may be conveniently made of brick, so proportioned in size, relatively to the chamber A, as to admit of the passage of a current of cold air around it, when desired.

This cold-air passage connects with the chimney at M, (see fig. 5,) the opening to the chimney being supplied with a damper, so arranged that it may be conveniently opened or closed at pleasure.

The casing is arranged with openings, communicating with the cold-air passage, which openings are provided with doors or other convenient fixture, as represented at N, for the ingress of cold air, and the regulation of its flow.

These openings may be of such number, location, and arrangement, as may be deemed to be best.

An air-passage around the wood-chamber, substantially such as above described as of our invention, may also be advantageously used for the same purpose, in connection with wood-treating apparatus, as made and used prior to our invention.

Into the chamber, as above described, the material to be treated is placed, as represented in fig. 4, as also the coal-tar, oil, or other material to be used in such treatment, as represented by O.

The doors of the chamber being closed, and also the damper and doors of the cold-air passage, and the fire being kindled in the furnace, the vapors of the oil or other material used will rise and fill the chamber, and may be maintained at a temperature of, say, from 212° to 230° Fahrenheit, until the wood or other substance under treatment becomes heated to that temperature to its centre.

A pressure may also be generated and maintained, thus more thoroughly protecting the wood, and more rapidly and surely forcing the naphtha, light oils, or other substances, evaporated at a low temperature, to its centre, however large or dense the wood may be, and so insuring the coagulation of the albumen, the vaporization of the water, or sap, and its expulsion from the wood, and the impregnation of the wood with the more volatile portions of the material used in the treatment.

When this is accomplished, it is desirable that the water expelled from the wood shall be removed from the chamber; and also, in order more thoroughly to expel the moisture from the wood or substance being treated, that a slight vacuum shall be created in the chamber.

These results are attained by means of the provision for the passage of cold air around the chamber, in connection with the conductors P P, which run the entire length of the chamber, inclining from their ends to the centre, and connecting with pipes Q, leading to a close receiver, R.

These pipes are supplied with cocks, S, to stop the flow of the condensed material from the chamber, whenever, or as long as deemed desirable, the material flowing back again into the chamber, when the cocks are closed, as soon as the conductors are filled.

These conductors may be inclined to either or both ends, and may be of any suitable form, and connected with pipes at any suitable point or points, or may convey the condensed material to any suitable receptacle.

The operation of removing the water or other material vaporized at a low temperature may now be easily seen, and also the process by which a partial vacuum is secured. The door or doors N being opened, and also the damper, at M, there will be a strong current of cold air around the chamber, cooling it sufficiently to condense the vapors within on the sides.

When condensed, they will flow down the sides, and into the conductors, and (the cocks S being opened) will pass to the receiver R.

This evaporation of the water, and its condensation and passage from the chamber, may be continued until it is all removed.

If, then, the fire be checked, and the evolution of vapors be thus caused to cease measurably, a partial vacuum will be secured.

The removal of the water and moisture being effected, and the cold-air passage and cocks S being closed, and the oil or other oleaginous substance being heated to a temperature of, say, 370° Fahrenheit, carbolic acid will be evolved, which, filling the chamber, will be rapidly absorbed by the wood, and a pressure may be again generated, more rapidly and surely driving it to the centre.

By raising the temperature still higher, if deemed best, the heavier oils or substances vaporizing at a high temperature, may be now vaporized and applied; or, if considered desirable, the chamber may readily be filled with oil or other substance, to coat the surface.

If it should be found to be desirable to introduce light oils or water, in small quantities, while the carbolic acid is being evolved, for the purpose of producing more rapidly and surely a pressure to force the acid to the centre, it may be done by any convenient means, or a jet of superheated steam may be introduced.

We do not limit ourselves to any particular form of chamber, nor to a chamber in which the oil or other substance, used in the treatment, covers its bottom for its entire length, nor for any special part of its length, nor to placing the oil or other material immediately under the wood or substance being treated, as it is evident that the oil may be confined to a small section of the chamber, or to an outward projection from some point thereof, but immediately connected and communicating therewith; and other changes may be made, without departing from the spirit or scope of our invention, it being understood that, in our invention, we always evaporate the oil, &c., in the same chamber, or in a part of the chamber in which the material to be treated is placed for treatment, and never evaporate it in a separate vessel or retort, as has been the practice heretofore, and then convey it to the chamber by pipes.

We claim, for the purpose of treating wood, textile fabrics, or other material, with the vapors of oleaginous or antiseptic substances or compounds, an apparatus so constructed that the evaporation shall take place in the same chamber in which the wood is placed, or in a section thereof, or in a projection forming substantially a part of the same.

Also, in combination with the vaporizing and wood-treating chamber, conductors, and suitable pipes and cocks, for carrying off from the chamber the condensed material, substantially as set forth.

Also, the combination, with a wood-treating chamber, of a cold-air passage around the same, provided with devices for controlling, at will, the ingress and egress of the air.

MARTIN VOORHEES.
GEO. W. N. CUSTIS.

Witnesses:
 FRANK BOARDMAN,
 JAMES M. CASSADY.